Feb. 3, 1970  L. L. HIGGINS  3,493,283
APPARATUS FOR STABILIZING OPTICAL INSTRUMENTS
Filed June 5, 1967  2 Sheets-Sheet 1
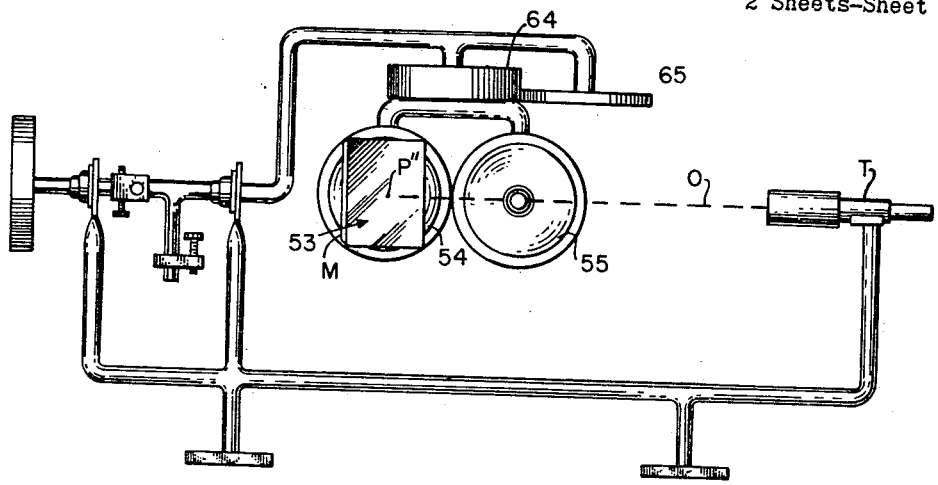
Fig. 3
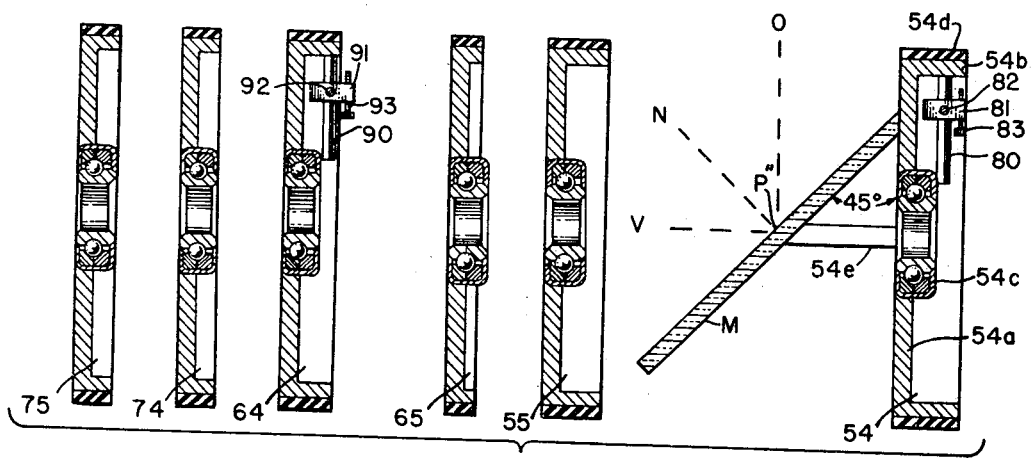
Fig. 4
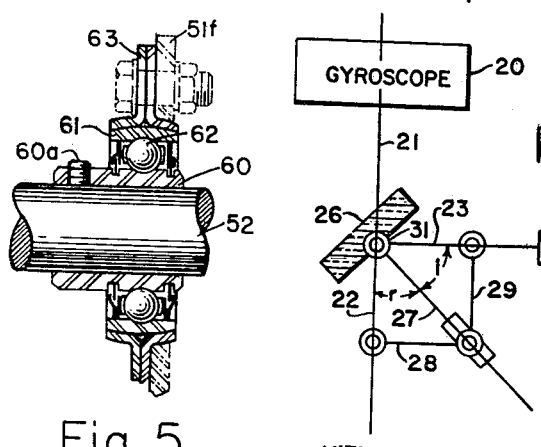
Fig. 5
Fig. 1
VIEW AXIS
Larry L. Higgins
INVENTOR
BY Donald C. Keaveney
ATTORNEY Feb. 3, 1970  L. L. HIGGINS  3,493,283
APPARATUS FOR STABILIZING OPTICAL INSTRUMENTS
Filed June 5, 1967  2 Sheets-Sheet 2

United States Patent Office 3,493,283
Patented Feb. 3, 1970

3,493,283
APPARATUS FOR STABILIZING OPTICAL INSTRUMENTS
Larry L. Higgins, Hermosa Beach, Calif., assignor to TRW Inc., Redondo Beach, Calif., a corporation of Ohio
Filed June 5, 1967, Ser. No. 643,500
Int. Cl. G02b 23/16
U.S. Cl. 350—16         5 Claims

ABSTRACT OF THE DISCLOSURE

An apparatus for stabilizing optical systems on an unstable platform such as a helicopter or other vehicle which does not require any modification of the optical instrument or a gyroscope or any additional source of power. The device comprises a mounting means whereby counteracting pairs of inertia wheels are rotatably mounted in planes which form a three dimensional orthogonal set. The counteracting pairs of inertia wheels provide a component of torque about an axis perpendicular to their respective plane in response to rotational vibrations whereby a reflecting mirror, prism, or the like, attached to one of the wheels is stabilized in such a relationship to the optical axis of the instrument and to the desired viewing axis as to nullify the effects of the rotational vibrations. The device provide the equivalent of a zero friction mounting and affords means for stabilizing in frames by providing correction torque responses which may have any one of a range of preselected ratio values of correction to disturbing torques.

BACKGROUND OF THE INVENTION

Wherever it is necessary to use an optical instrument such as binoculars, telescope, sextant, camera, or the like, on a moving platform, the amount of magnification which in practice is usable, is severely limited by small rotational vibrations transmitted from the platform to the optical instrument. Thus, it is commonly recognized that even hand held binoculars used by an individual simply standing on the ground suffer from the problem of minor vibrations which are optically magnified in proportion to the magnifying power of the instrument. This, of course, makes for extremely unclear and unpleasant viewing at high magnification powers. Many efforts have been made to provide stabilizing arrangements. Thus, it is common to provide a stabilized prism or mirror within the optical path of the instrument at half the optical path between objective and eyepiece in order to cancel vibration effects. This, however, places undesirable constraints on the optical design of the instrument. Various external mounting arrangements have also been used, including gyroscopically controlled gimbal mounts and the like. These, of course, include the familiar mariner's compass type of mounting. However, in most of these arrangements, it is necessary to have a source of electrical power to operate the stabilizing device, for example, to run a gyrostabilizer. Alternatively, where purely mechanical gimbal mountings have been used, the weight and mechanical complexity of linkages, and the like, render the system relatively inflexible as to ease and types of application to which they are suited. The present system, for example, permits the optical eyepieces to be rigidly attached to the observer's frame of reference and still permit remote adjustment of the direction of view simply by moving a mirror mounted, for example, externally of an aircraft.

It is an object of this invention to provide an apparatus for stabilizing optical instruments which does not require the use of electrically operated devices such as gyroscopes or the like.

It is a further object of this invention to provide an entirely mechanical means for stabilizing optical instruments which can be adjusted to provide the equivalent of zero frictional correction for rotational vibrations about a set of three mutually orthogonal axes.

It is a further object of this invention to provide such an apparatus which is mechanically simple and relatively lightweight and which overcomes the above noted problems of the prior art.

SUMMARY OF THE INVENTION

These and other objects and advantages are achieved, as will be more apparent from the detailed description below, by providing an apparatus in which a mirror or other optical means affording a reflection plane is mounted on a member which is part of an inertially stabilized system. The system preferably comprises three pair of counteracting inertia wheels, each pair of which are in effect rotatably mounted parallel to a rod which is aligned along one of three mutually orthogonal axes and which is parallel to the plane of the wheels' surfaces. The counteracting inertia wheel systems can be shown to be such that when a force tends to rotate the rod about an axis perpendicular to it, the inertia wheels will generate a counter-force or torque which will maintain the rod in its initial position. By this means, when the design parameters of the system have been properly adjusted, the apparatus affords the equivalent of a zero friction gimbal mounting for the reflection surface so that the angle of incidence between the optical axis of the optical instrument and the normal to the reflection plane can be maintained equal to the angle of reflection between the desired axis of view and the same normal to the reflection plane irrespective of changes in the angle of incidence due to rotational vibratory motions of the system on which the optical instrument is mounted.

BRIEF DESCRIPTION OF THE DRAWINGS

FIGURE 1 is a schematic diagram illustrating a basic optical principle of the invention.

FIGURE 3 is a side elevational view, partly broken away, showing the apparatus of FIGURE 2 with the mirror supporting shaft rotated 180° from the position of FIGURE 2 to place the desired view axis in a direction looking toward the observer rather than away from the observer, as in FIGURE 2.

FIGURE 4 is a plurality of sectional views of the various inertia wheels of the apparatus of FIGURES 2 and 3.

FIGURE 5 is a sectional view of a shaft mounting bearing used in FIGURE 2.

DESCRIPTION OF THE PREFERRED EMBODIMENTS

Figures 2, 2A:
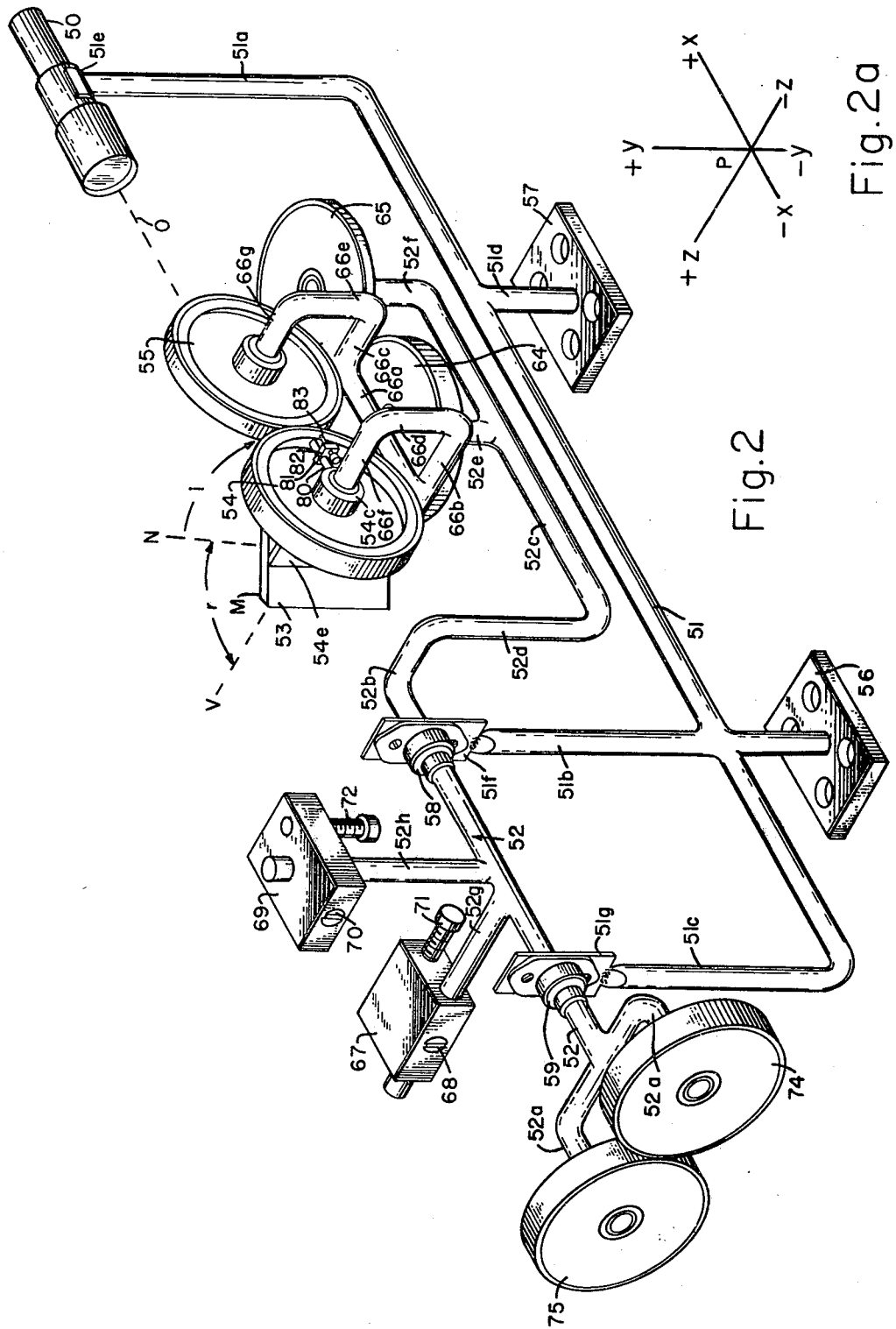
FIGURE 2 is an isometric view showing a stabilizing apparatus in accordance with the present invention.
FIGURE 2a is a schematic view illustrating the set of three mutually orthogonal axes embodied in the apparatus of FIGURE 4.

In many uses of any optical instrument such as a telescope, binoculars, camera or the like, it is often desired to construct a device which stabilizes the instrument optically so that it may be used by a person on an unstable moving platform. The device must be capable of being added on to the optical instrument without requiring the instrument to be modified, if it is to find maximum utility. Often it is also required that the instrument such as a telescope look in another direction than the direction of the eye of the user. Frequently a mirror is used to change the direction of view. The device described herein uses such a direction changing mirror to stabilize the optical view. The stabilized mirror device may be at some distance from the optical instrument or telescope proper and from the eye of the viewer so that the overall arrangement can look around certain obstructions of the field of view as seen from the observer's eye position. This is frequently desirable, for example, where a pilot in a cockpit wishes to use a telescope which is essentially a part of a periscope system. Whatever the particular arrangement may be for a specific application, however, it will be understood that the system presupposes that the stabilized mirror will first be moved to select a direction of view and will then be stabilized in that fixed or preselected view axis. The telescope eyepiece need not move with respect to the observer's eye. An optically flat mirror can preferably be used which is relatively large and heavy. For example, a mirror which is 8 inches square, one inch thick, and weighs 5 pounds may be used to accommodate wide angle optical instruments and to permit placement at relatively large distances from the telescope objective. The device to be described herein requires no electrical power and does not require gyroscopic stabilizers.

However, for the purpose of explaining one principle involved in the operation of the device, let us first assume that a gyroscope stabilizer 20 is used in an arrangement such as is schematically illustrated in FIGURE 1. The output shaft 21 of the gyroscope is rigidly integral with one arm 22 of a hinged scissors mechanical divider. The direction of view of the sytsem is along this arm 22. A second arm 23 of the hinged divider lies in the optical axis of the telescope 24 and is the direction of view of the eye 25 of the observer using the system. Telescope 24 is attached to arm 23 of the hinged scissors mechanical divider. The large mirror 26 having the characteristics described above is attached to the central divider rod 27 which is always constrained by arms 28 and 29 which are attached to a sleeve 30 through which the central arm 27 passes to lie coplanar with the scissor arms and halfway between them. The mirror 26 is attached to rod 27 at a 90° angle so that the rod 27 lies in the direction of the normal to the reflecting plane which in this instance constitutes the reflecting surface of the mirror 26. Since the rod 27 is constrained by the mechanical scissor dividers to always remain halfway between the arms 22 and 23, it follows that the angle of incidence, $i$, between the optical axis 23 of the telescope, which intersects the reflecting plane surface of the mirror at its pivot point 31 and the central arm 27 of the dividers which always remain normal to the mirror and intersects it at pivot point 31 will always remain equal to the angle of reflection, $r$, between the central arm 27 and the arm 22 of the scissors divider which lies in the direction of view of the system.

Now let us assume that the angular momentum of the gyroscope 20 is so large that the direction of the viewing arm 22 cannot be changed by vibrational forces which may affect the system. The entire arrangement, may, however, translate about in some irregular way due to motion of the platform on which the observer and the system are located. The observer, his eye, and the telescope can be thought of as attached to each other, since the observer may lean his head on a headrest attached to the telescope.

The vibration and motion of the platform causes the observer, his eye, and the telescope to move about in some uncontrollable random way. Let us assume, for purposes of initial simplification, that this motion is confined to the plane defined by the scissor arms 22, 23 and 27, and within this plane, as is well known, it can be resolved into translational and rotational or angular components. During this motion, the scissor divider always works to place the arm 27, that is, the normal to the mirror, halfway between the telescope axis 23 and the view axis 22. By the reflection law for mirrors, this means that the angular direction of the field of view of the observer never changes, in spite of the motion of the telescope. The entire system may be translated so that the view axis moves parallel to itself or along itself, but angular or rotational components of motion are cancelled by the action of the gyroscope 20 and the scissor divider arrangement. That is to say, the nullification of the angular components of motion by the counteraction of the gyroscope rotationally stabilizes the telescope within the plane being considered.

This schematic arrangement, however, suffers from the problem that the scissor divider has friction in its bearings and thus a large angular momentum gyroscope is needed to stabilize the direction of view. Also, since the large heavy mirror must move, random forces are applied to it, which, by reaction, are also applied to the gyroscope causing it to precess slightly, thus changing the reference view direction. Electrical power, air pressure or vacuum is required to run the gyroscope.

To avoid these problems, the device shown in detail in FIGURES 2, 3, 4, and 5 uses an inertial stabilization system in place of the gyroscope but continues to use the scissor divider concept whereby a mirror is stabilized to remain with the normal to its surface lying halfway between a preselected fixed direction of view and the possibly angularly moving optical axis of an optical instrument. The divider concept as embodied in the inertially stabilized device has the mirror reflection law built into it, that is, the mirror moves half the angle between the viewing direction and the telescope axis in response to changes in the angular position of the telescope axis. The problem is to provide a constraining device which will produce this desired half angle motion of the mirror in response to forces or torques which may be acting to move the telescope axis.

Such an arrangement, which is adapted for practical use, is shown in the structural views of FIGURES 2, 3, 4, and 5.

Turning now to FIGURES 2, 3, 4, and 5, the structure of a preferred embodiment of the invention will first be considered in detail before analyzing its mode of operation in accordance with the foregoing principles.

In FIGURE 2, a telescope 50 having an optical axis indicated by the dashed line O is mounted on a frame member 51 which is adapted to be rigid with the telescope and with the unstable platform on which the system and the observer are to be mounted. That is to say, the observer, the telescope 50, and the frame 51 will move in unison with each other. The frame member 51 has upright arms 51a, 51b, and 51c. The arm 51b is prolonged downwardly to terminate integrally with a first mounting plate 56 which is provided with a plurality of holes for screw or bolt attachment to any convenient surface such as a tripod or the like. A stud 51d extends downwardly from the frame member 51 parallel to the extension of 51b and ends in a second mounting plate 57 which is similar to and in the plane of the mounting plate 56. Plate 57 is also provided with holes adapted to receive fastener means. The upper end of arm 51a is provided with a cradle 51e which is here shown as being welded to the telescope 50 for permanent rigid attachment thereof. It will, of course, be understood that the cradle 51e could be provided with strap means or any other convenient fastening arrangement for removably attaching an optical instrument thereto. It will also be understood that the telescope is shown merely as an illustration and that any suitable optical instrument could be positioned on arm 51a so that its optical axis is along the line O.

The upper end of supporting arm 51b is welded to a support plate 51f and similarly, the upper end of arm 51c is welded to a supporting plate 51g. The supporting plates 51f and g, respectively, have ball bearing mounting assemblies 58 and 59 bolted thereto. The two ball bearing assemblies are identical and are shown in a detailed cross sectional view in FIGURE 5.

It will be noted from FIGURE 5, that the shaft 52 is rotatably mounted in the ball bearing assembly which comprises an inner race 60 and an outer race 61, between which a plurality of ball bearings 62 are confined and a conventional outer housing means 63 which is bolted to the plate 51f and which confines the inner and outer races in operative relationship with the ball bearings in a manner which is well known in the art. The inner race 60 may be attached to the shaft 52 by a set screw 60a. The entire bearing assembly is of a commercially available flange mounted self aligning radial bearing type and the manner in which it is grease packed and its mode of operation is well understood in the art.

The main portion of the shaft 52 is rotatably supported in bearing members 58 and 59. A U shaped member 52a is formed integrally with and transversely to one end of the main portion of shaft 52. The arms 52a' and 52a" of the U provide bearing stubs for a first pair of counteracting inertia wheels 74 and 75.

An offset member 52b projects outwardly from the other end of the main portion of shaft 52 in a plane and direction parallel to the plane and direction of the cross member 52a. A double U member 52c is formed with one of its arms 52d integral with the offset member 52b for supporting purposes. Two additional stub or arm members 52e and 52f project upwardly from member 52c and are integral with it to provide bearing stubs for a second pair of counteracting inertia wheels 64, and 65.

A pair of arms 52g and 52h project outwardly at right angles from a point on the shaft 52 between supports 51b and 51c and are positioned at right angles to each other and to shaft 52 at substantially the midpoint between the supporting bearing arms 51b and 51c. The arm members 52g and 52h support adjustable vernier weight members which are used to statically balance the apparatus in a completed assembly in a manner which will be described below. At this point, however, it should be again pointed out that the shaft 52 is integral with its protrusions and extensions 52a, 52b, 52c, 52d, 52e, 52f, 52g, and 52h and is mounted for free rotation in the bearing support members 58 and 59. It should also be pointed out that the main portion 52 of the shaft which is the portion passing between bearing members 51b and c is aligned to be coaxial with the optical axis O of the telescope 50.

Referring, for the moment, to FIGURE 2a, there is shown a three dimensional set of orthogonal Cartesian coordinates in which the three axes intersect at an origin point P and wherein the horizontal axes are indicated by the plus and minus x direction, which are, for purposes of reference and discussion, taken to be parallel to the optical axis O and the shaft axis 52 in the apparatus of FIGURE 2. The vertical direction is defined by the plus and minus y axis and the third dimension which would be perpendicular to the plane of the drawing is defined by the plus and minus z axis. For purposes of discussion, it is convenient to identify in FIGURE 5 the point P", which is the point on the reflection surface M of the mirror 53 at which the optical axis O of the telescope intersects that surface. The shaft 52 and its attached assembly has been rotated by 180° in FIGURE 5 from a position shown in FIGURE 4 in order to show both a front and back view of the structure. Hence, the point P" is not seen in FIGURE 2. However, referring again to FIGURES 4 and 4a, the optical axis O will intersect the reflection plane surface M of the mirror 53 at the point P" and the direction of view will be as indicated by the dashed line V in FIGURE 2. Since, in the arrangement as shown, the mirror's surface M is mounted to form a 45° angle of incidence to the optic axis O, where the angle of incidence is defined as the angle, i, between the optical axis O and the normal, N, to the plane, M, of the mirror at point, P", the angle of reflection, r, between the direction of view indicated by the dashed line V and the same normal, N, to the mirror will also be 45°. For purposes of discussion, it is convenient to note that the optical axis O and the axis of the shaft 52 and the member 52c which is parallel thereto lie in what is defined by FIGURE 2a as the x axis direction, whereas the view direction indicated by the line V and the offset member 52b lie in a direction defined in FIGURE 2a by the z axis. The vertical support members 52d, 52e, and 52f in turn lie in the y axis direction when the apparatus is positioned as shown in FIGURE 2.

Returning now to FIGURE 2, it will be noted that the second pair of inertia wheels 64 and 65 are rotatably mounted by a ball bearing support on the bearing studs 52e and 52f. Welded to a diameter of the wheel 64 is a rod or shaft member 66a which is shown in the x direction and which has parallel protrusion 66b and 66c extending in the minus z direction. Extensions of these members in turn are formed as indicated by the portions 66d and 66e which extend upwardly in the plus y direction and are then formed integrally with bearing studs 66f and 66g which extend forwardly in the plus z direction to form mounting or bearing arms for a third pair of inertia wheels 54 and 55. The mirror 53 is rigidly attached to the inertia wheel 54 at a 45° angle between the plane of the surface of the mirror and the plane of the surface of the wheel 54. The arms and supporting arrangement are so proportioned that the wheels 54 and 55 are sufficiently offset in the minus z direction from the optical axis O so that the optical axis clears the surface of the wheels and intersects the mirror at a central point P" as can be seen more clearly in FIGURES 5 and 6. It will be noted in FIGURE 6 that mirror M is supported at a 45° angle to the surface of wheel 54 by a pair of studs 54e and is so positioned that the axis of wheel 54 is coaxial with direction of view V, which line is intersected at point P" on mirror surface M by the optic axis O.

The various rod and shaft members 51, 52, 66 and the like, are preferably formed of aluminum rod or some other easily worked material which affords rigidity without excessive weight. Of course, if desired, the steel rod can also be used.

It is preferred in the overall design of the apparatus to attempt to place the center of gravity of the inertia wheel and mirror assembly on the one hand and the pair of inertia wheels 74 and 75 on the other end, all of which are attached to the shaft 52, generally near the midpoint of that portion of shaft 52, supported between bearing members 58 and 59. This can be accomplished by controlling the density and dimension of the shaft member 52a and the size and density of the various inertia wheels in a manner to be discussed below. Such an arrangement minimizes torques on bearings 58 and 59.

On arm 52g which lies in the z direction, a first vernier weight member 67 is slidably positioned and held in place by a set screw 68. Similarly, a vernier weight member 69 is slidably positioned on arm 52h and is held in the desired place by a set screw 70. The arm 52h, it will be noted, extends orthogonally to 52g and lies in the plus y direction as shown. Secondary vernier adjustments are obtained by means of a screw member 71 which is threadedly received in weight 67 and a similar screw member 72 which is threadedly received in weight 69. As noted, the apparatus is initially designed insofar as possible to distribute the weight so that a static balance will be achieved. That is to say, about the central point of the shaft 52 between bearing members 58 and 58 along the x axis the density of members can be adjusted to balance the weight of the apparatus supporting the mirror to provide for static rotational stability about an axis through this point and parallel to the z axis. This is desirable in order to eliminate torque on the bearing members 58 and 59. More importantly, however, it is necessary to achieve static balance with respect to rotations about the x axis so that when the mirror is positioned at any one given angular position, it will remain there in a static condition in spite of the free rotatability of the shaft 52 in its bearings. This characteristic is primarily achieved by selecting materials and dimensions of the inertia wheels and rods to give a very close approximation to such static balance. The final adjustment in use, however, must be made by the vernier weight 67 and 68 and their secondary vernier screws 71 and 72 which, by sliding up and down along the arms 52g and 52h, aligned respectively in FIGURE 4 in the z and y axes, can provide counterbalancing torques to any unbalanced torque, tending to rotate the shaft 52 in the static state, that is, when the system is at rest. When these weights and verniers are properly adjusted, it is possible to grasp the shaft member 52c or any convenient portion of the shaft system 52 and rotate the mirror to any desired direction of view in the y, z plane and have the mirror and its mounting system remain statically balanced in the position in which it is set. The action of the inertia wheels is then such as to counteract any dynamic vibrational torques which may tend to rotate the system away from the position to which it has been set after the system is in motion.

In order to place the direction of view, V, in a plane other than the y, z plane, it is necessary to first manually rotate inertia wheel 64 and then follow the procedure above.

The inertia wheels are shown in the detailed cross sectional views of FIGURE 6, wherein the wheels 54, 55, 64, 65, 74, and 75 are each shown. The wheels are of generally similar construction so that only the wheel 54 will be described in detail. The wheel 54 comprises a round disc shaped member 54a, which may be made of aluminum, steel, or any other suitable material. The disc member 54a has an angular flange member 54d protruding at right angles therefrom. The flange member 54b is integral with disc 54a and its dimensions and density may be varied to control the overall moment of inertia of the wheel in the manner dictated by the design parameters of any particular system. A central bearing assembly 54c is seated in an aperture in the center of the disc 54a and is adapted to receive the mounting shaft 66f on which the wheel 54 is rotatably mounted by the ball bearing assembly. The ball bearing assembly 54c comprises an inner and an outer race between which ball bearings are positioned to rotatably support the wheel 54 in a low friction rotational relationship to its supporting shaft, which is preferably welded to the inner side of the ball bearing assembly. Bonded to the outer periphery of the flange 54b is a rubber tire 54d.

The supporting shafts of adjacent wheels are spaced so that the rubber tires of the adjacent wheels in each pair of counteracting inertia wheels are held in firm frictional contact with each other. The rotation of one wheel of a pair will thus cause its mate to rotate in the opposite direction.

In accordance with the design criteria developed above, each of the wheels 54, 55, 64, 65, 74, and 75 has a radius which is equal to the same arbitrary convenient constant value. At least each wheel of each pair must, in this system, have a radius equal to that of its mate, and it is convenient to make all radii equal.

Wheels 74 and 75 are identical to each other in all respects so that they have equal moments of inertia, and for the 74, 75 pair, $\lambda = 1$. Basically, this pair of wheels function like a flywheel simply to provide an equal and opposite restoring torque to prevent shaft 52 from being rotated. If desired, this pair of wheels could be replaced by a flywheel attached to rod 52 and lying in the y, z plane. If the inertia wheels are used, however, and if it is found that bearing friction in any given system is not negligible in mount 58, 59 the value of $\lambda$ for wheels 74, 75 can be adjusted by varying the ratio of the moments of inertia of this pair of wheels to overcome this factor and produce an effectively zero friction mounting for shaft 52.

Wheel 54 (including the tire, mirror and any other mass integral with it) should have a moment of inertia which is three times the moment of inertia of wheel 55 and all mass integral with it. Similarly, wheen 64 and all mass integral with it (including the entire assembly of wheels 54 and 55, which is welded to wheel 64 by member 65a) should have a moment of inertia which is three times that of wheel 65. This 3 to 1 ratio, it will be recalled, will produce a value of $\lambda = \frac{1}{2}$, which will result in the desired scissor divider action.

Finally, in addition to static balance of the whole system to prevent rotation about shaft 52, each wheel and all mass integral with it must be statically balanced about its own mounting shaft or axis, that is, the center of gravity of the mass of the wheel and its integral attachments must lie at the center of its mounting shaft.

This is easily achieved for wheels 74, 75, 65, and 55 simply by making them symmetrical. Vernier plug or set screw adjustments, may, if desired, be provided to correct for manufacturing tolerances. Wheel 64, of course, has the mirror M attached thereto in a non-symmetrical fashion. To counterbalance the mirror, a weight 81 is slidably mounted on a rod 80 which extends from the hub to the rim of the wheel and is held in a selected position by setscrew 82. An adjustable vernier screw 83 is also provided to achieve a balancing arrangement similar to that provided by weight 67 for shaft 52. Alternatively, or additionally, if desired, a web or pattern may be cut out of the face of wheel 54 to achieve a weight distribution counterbalancing mirror M.

A similar counterweight 91, slidable on rod 90, held by setscrew 92 and provided with vernier screw 93 is provided for wheel 64 as seen in FIGURE 4. Additional counterbalancing for wheel 64 is achieved by increasing the density of members 66d and 66e. Thus, in a system where aluminum tubing is used for these and other frame members, necessary amounts of lead or other weights may be placed inside members 66d and 66e to place the center of gravity of wheel 64 and all mass integral with it at the center of member 52e.

In designing the system, wheel 54 and the mirror mount are first statically balanced about shaft 66f. Wheel 55 is then provided with balance about 66g and ⅓ the moment of inertia of 54. Next, wheel 64 and its attachments (including wheels 54 and 55) is statically balanced about shaft 52e. Wheel 65 is then provided with static balance about 52f and ⅓ the moment of inertia of the wheel 64 system. Next, the mass of the wheel system 74, 75 and its mounting members 52a, etc., is adjusted to place the center of gravity of the entire shaft 52 system midway between bearings 58 and 59. Weights 67 and 69 are finally adjusted to provide static balance about shaft 52. Once static balance has been achieved, the dynamic response will be that which has been explained in the principles and equations set forth above.

Returning to FIG. 2, it will be noted that the mounting studs for the wheels are spaced in such a fashion that the rubber tires of the wheels are pressed into firm contact. In the arrangement of FIGURE 4, rotation of one of the wheels of a pair in a clockwise direction will cause the other wheel in the pair to rotate in a counterclockwise direction. This we have defined as direct coupling.

It will be noted, from FIGURES 2 and 2a, that the wheels 54 and 55 are mounted on a rod which in the detailed embodiment comprises the member 52c which lies in the x axis. This pair of wheels is thus operative to generate a restoring torque to counteract any rotational movements about the z axis, which is perpendicular to the x axis, that is, which is parallel to the direction of the mounting or bearing arms 66f and 66g, on which the wheels are supported. Similarly, wheels 64 and 65 are mounted in a direction such that they will generate counter-torques to compensate for any rotational motion about the y axis which lies parallel to the direction of their supporting or bearing arms 52e and 52f. Finally, the wheels 74 and 75 are mounted on arms 52a' and 52a" which lie in the direction of the x axis so that these wheels will generate a torque tending to compensate for any tendency to rotate the mirror about the $x$ axis.

It is well known that any rotational motion no matter how complex can be resolved into components of rotational motion about 3 mutually perpendicular axes such as the axes $x$, $y$, and $z$ shown. The wheels are arranged to generate counteracting torques to nullify such rotational forces. This is achieved by proportioning the moments of inertia and the radii of the inertia wheels in accordance with the equations given above in such a way that $\lambda = \frac{1}{2}$ for 54, 55 and 64, and 65, that is, that the gear ratio between their wheels is one half so that, if the telescope 50 is, for example, rotated about the $y$ or yaw axis by rotation of the unstable platform on which it is mounted by plates 56 and 57, then the pair of inertia wheels 64 and 65 will be caused to induce a torque such as to overcome half of this motion, so as to maintain the normal N to the surface M of the mirror, always halfway between the changing direction of the axis O of the telescope and the fixed direction of the desired axis of view V. Wheels 54 and 55 for which $\lambda = \frac{1}{2}$ produce a similar action to counteract rotation about the $z$ axis.

In this fashion, the arrangement acts as the equivalent of the scissor divider arrangement of FIGURE 1 with respect to rotations about the $y$ and $z$ axes both of which are perpendicular to the $x$ or optical axis O of the telescope in the same fashion that scissor arm 22 is perpendicular to scissor arm 23 in FIGURE 1. Of course, rotations about the $x$ or optical axis O itself are simply fully counteracted by making $\lambda = 1$ in wheels 74, 75 since the desire is simply to maintain N in the same plane as O and V. That is to say, the reflection angle law is not per se involved in correcting rotations about this axis; hence, $\lambda$ must equal 1, rather than $\frac{1}{2}$. However, the gyroscope shown in FIGURE 1 is unnecessary, since the gear ratio of $\frac{1}{2}$ in the inertia wheel action implements the scissor divider action with respect to an idealized fixed direction of view V. A similar corrective action is initiated by the system in response to rotational torques about any one of the axes $x$, $y$, or $z$, which tend to displace the mirror from its position which was initially manually established.

Thus, while the entire system may, of course, translate along any one of the axes or have components of translation therealong, nonetheless, the inertia wheels will correct for rotations about these axes. It is these dynamic rotational motions which are the vibrations which distort normal optical stability. Thus, the transient dynamic rotations of the telescope 50 will still exist when it is rigidly attached to an unstable moving platform. However, the bearing mounted inertia wheel control system will act to maintain direction of view V stable in a line parallel to the $z$ axis as shown in FIGURE 4 by keeping N halfway between the desired fixed direction V and the moving axis O, just as the scissor divider did.

The operation of the device depends upon the fact that a means of moving the inertia wheels 54 and 64 at half the angular speed of their effective mounting rods has been realized. The mirror is attached to wheel 54 and 54 in turn is mounted on 64, and in turn, both of these wheels are mounted on shaft 52 which is given 1 to 1 or full stabilization against rotation about the optic axis O or axis of the shaft 52 by the third pair of wheels 74 and 75. Thus, all components of rotation can be corrected for. These corrections by the inertia wheels provide the equivalent of a zero friction gimbal mounting for the stabilized mirror even though the bearings mounting the shaft 52 and the inertia wheels are not perfectly frictionless.

It is, of course, desirable that the bearings be as nearly similar and as low in friction as practically possible. However, whatever the actual friction in the particular system, the inertia wheels can be designed to counteract the torques transmitted thereby.

As earlier noted, the vernier weights 67, 69, 81, and 91 and the secondary vernier adjustment screws are provided to afford an adjustment to achieve static balance about the $x$ axis and the axes of torque wheels 54 and 64, when the platform on which the system is mounted is at rest so that one may rotate the mirror to any angular position and have it remain there. Initial scanning for the direction of view, may, if, desired, also be facilitated by rotation of the tripod or platform on which the system is adapted to be mounted. Additional very fine screw adjustments of inertia or radii can, if necessary, be made in any of the inertia wheels in an obvious manner to satisfy the above specified design requirements, should manufacturing tolerances be inadequate. Mechanical adjustments of the order of 1:1,000 are typically required, which is quite within the range of usual mechanical devices. It is even possible, if necessary, to make such adjustments in the field, similar to a focusing adjustment to make the balance perfect at the time of use. The telescope may be intentionally vibrated and screw adjustments made until no vibration is seen in the field of view. Such adjustments may, for example, be made by screws threadedly received in the outer flange of the inertia wheels at their inner surfaces.

It will, of course, be understood that the mounting arrangement shown in the drawings and described herein is merely an example and that many variations could be made for other applications. It should especially be noted that the length of member 51 can be extended to any degree desired so that the telescope can be considerably more remote from the mirror than is shown herein. As earlier noted, the telescope may form a part of a periscope system leading from the inside of an aircraft or vehicle to an external position to which the mirror is mounted. In such an arrangement, of course, it would be necessary to add means for initially positioning the mirror from inside the craft. This could readily be accomplished by cables, linkages, or the like, which actuate any conventional caging arrangement to first position the mirror and then release the caging apparatus from contact with the system shown.

As shown, the apparatus can readily be mounted for viewing through a normal window, which would be interpositioned between the telescope and the mirror, or the apparatus can be entirely inside the moving craft, mounted on a tripod or the like.

What is claimed is:

1. Apparatus for stabilizing an optical system to be mounted on an unstable platform comprising:
   image forming means having an optical viewing axis for viewing a target,
   optical reflecting means disposed between said image forming means and target,
   and passive inertial means including a pair of interconnected stationary balanced flywheels pivotally mounted with respect to said optical system and responsive to rotation of said optical system about an axis transverse to the pivot axis of the flywheels to rotate said reflecting means in the same direction as the rotation of said optical system but through an angle that is $\frac{1}{2}$ of the angle of motion of said system, thereby to maintain said image forming means sighted on said target despite said rotation of said optical system.

2. In the apparatus of claim 1, a second pair of interconnected pivotally mounted passive balanced flywheels responsive to rotation of said optical system about an orthogonal axis to rotate said reflecting means in the same direction about said orthogonal axis but through $\frac{1}{2}$ of the angle of motion of said apparatus about said orthogonal axis, thereby to maintain said image forming means sighted on said target despite rotation of said optical system about said axis and said orthogonal axis.

3. In the apparatus of claim 2, one of each of the pairs of stationary flywheels having a much smaller moment of inertia than the other and being reversely coupled to the other for pivotal movement in the opposite direction in response to motion of the optical system.

4. In the apparatus of claim 3, said image forming means comprising a telescope and said optical reflecting means comprising a mirror.

5. A stabilized optical system adapted to be mounted on an unstable platform comprising:
viewing means supported on said platform,
pivotally mounted reflection means disposed between said viewing means and a target to be observed,
and an unpowered passive inertial mechanism responsive to pivotal motion of said platform about any one of a plurality of orthogonal axis to pivot said mirror about said axis in the same direction but for ½ of the displacement thereby to maintain said viewing means sighted on said target independently of said platform motion,
said passive inertial mechanism including for each axis, a substantially stationary balanced flywheel pivotally balanced with respect to said optical system about an axis transverse to the axis to be stabilized, and means coupled to said stationary flywheel and responsive to the relative movement between said platform and said flywheel to position said mirror.

References Cited

UNITED STATES PATENTS 2,886,972  5/1959  Plsek _____ 74—5.44

PAUL R. GILLIAM, Primary Examiner